Oct. 5, 1971    A. I. MUIR    3,609,882
PHASE ANALYZING EDUCATIONAL AID
Filed July 9, 1969    2 Sheets-Sheet 1
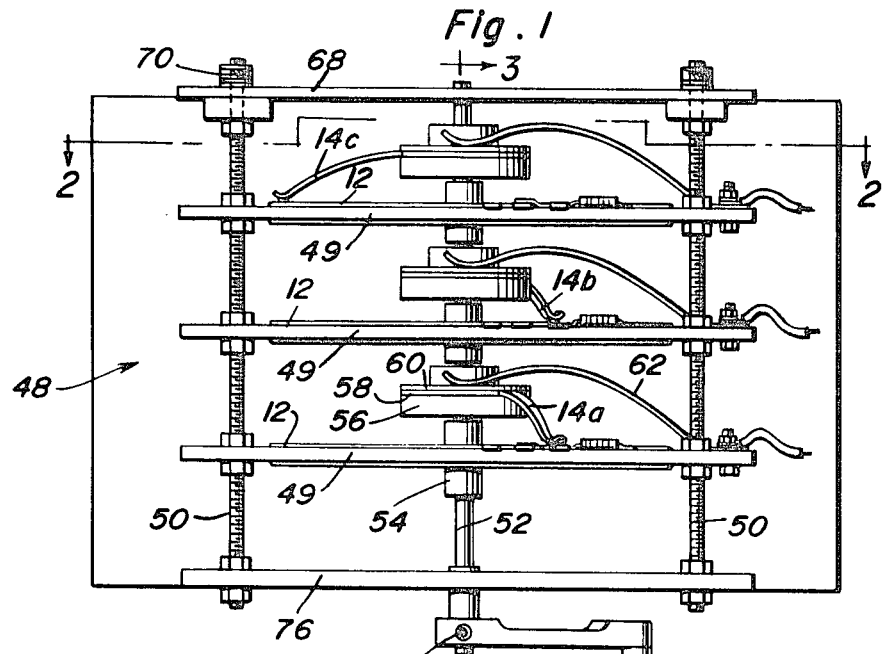
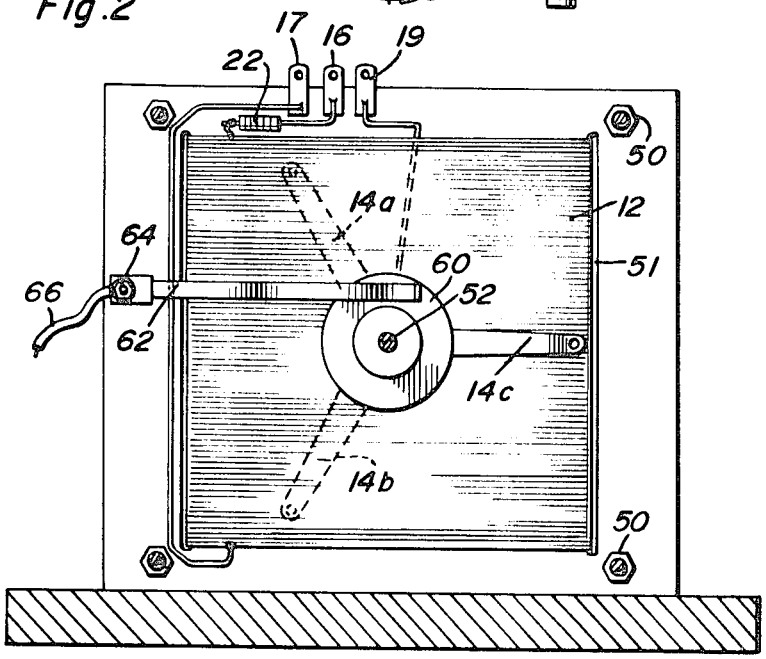
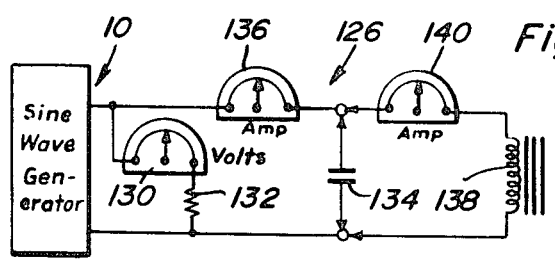
Andrew I. Muir
INVENTOR.

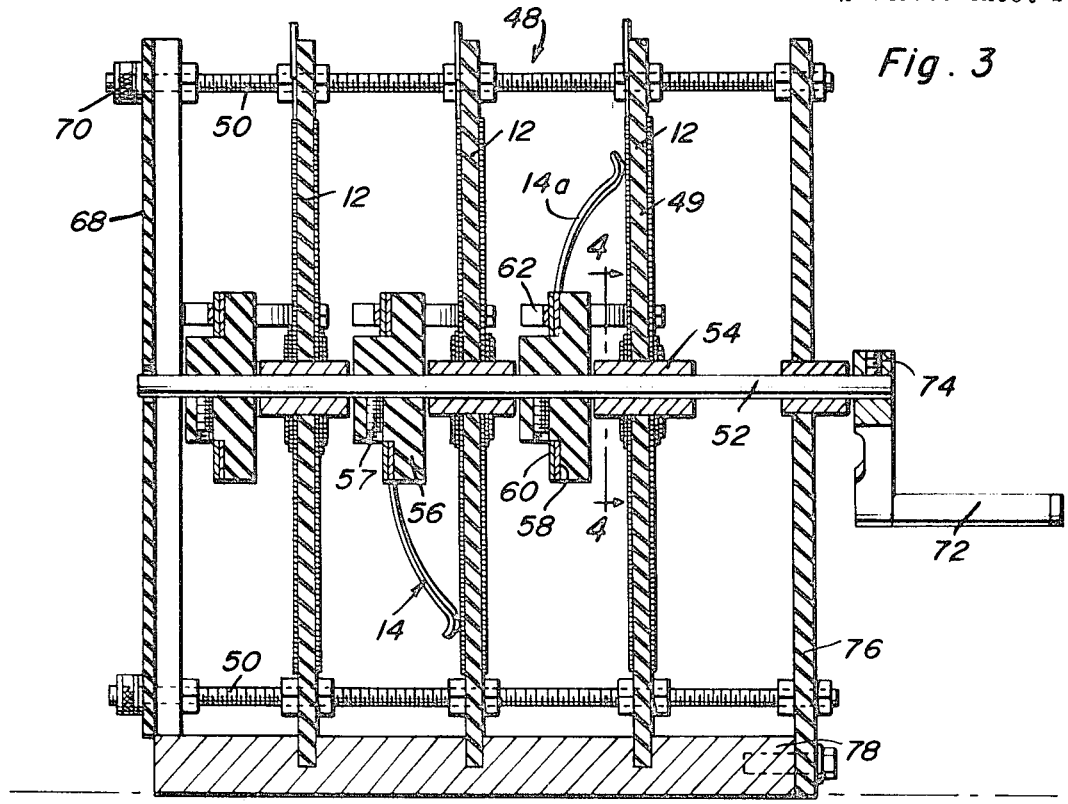
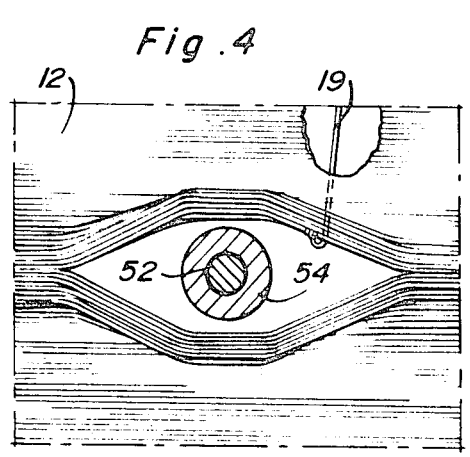
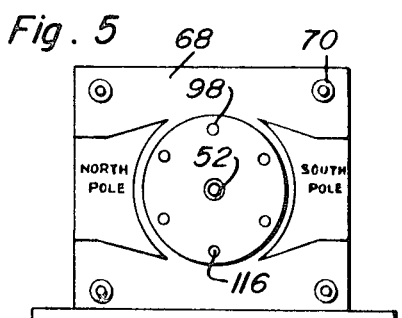
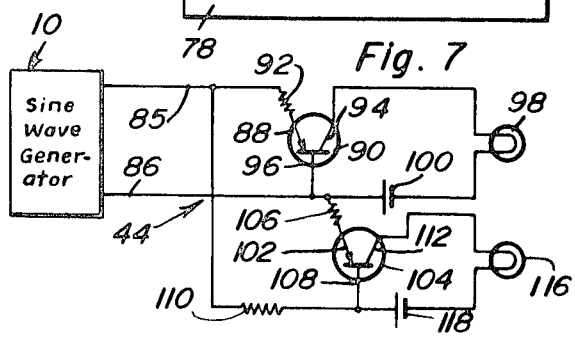
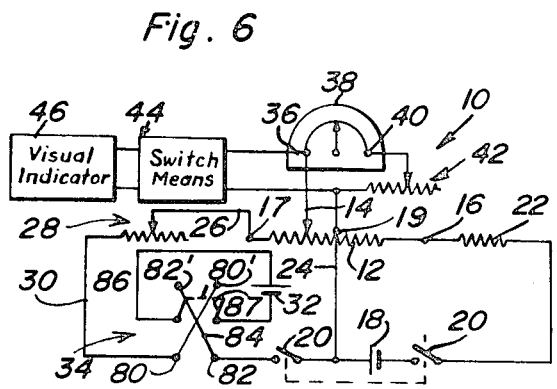
Andrew I. Muir
INVENTOR

United States Patent Office 3,609,882
Patented Oct. 5, 1971

3,609,882
PHASE ANALYZING EDUCATIONAL AID
Andrew I. Muir, Rte. 1, Box 15A,
Coos Bay, Oreg. 97420
Filed July 9, 1969, Ser. No. 840,303
Int. Cl. G09b 23/18
U.S. Cl. 35—19 A
9 Claims

ABSTRACT OF THE DISCLOSURE

A multiple potentiometer assembly connected to a D.C. source of voltage and operating to generate plural sinusoidal waveforms having a preselected phase relation. The output of each generating potentiometer is connected to a D'Arsonval movement which indicates the sinusoidal fluctuation. Also, the generator output is connected to separate switch means which become separately gated during positive and negative cycle portions. Indicating lamps provide visual indication during these cycle portions. Switch means are connected to the waveform generator to effect a rectified output when desired.

---

The present invention relates to an educational aid for providing a visual demonstration of the phase characteristics of sinusoidal signals.

In a course of instruction dealing with elementary A.C. theory, it becomes necessary to instruct a student on the characteristics of sinusoidal waveforms. Graphical descriptions of the forms are generally presented to the student during which time he must gain an appreciation for the abstract characteristics of these wave shapes. The learning process becomes more time-consuming and complex when multiple phase operation, such as three phase characteristics are presented. Oftentimes the learning student becomes confused by the association of individual phases which hampers subsequent learning.

The present invention provides a visual educational aid for demonstrating the effect of sinusoidal signals on electrical apparatus. Further, means are provided for demonstrating multiple phase operation which renders the relationship clear and easily understood. Further, an aid is provided for demonstrating the effect of three phase voltage generation in the production of a rotating magnetic field in a motor.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a top plan view of a multiple phase signal generator.

FIG. 2 is a longitudinal sectional view taken along a plane passing through section line 2—2 in FIG. 1.

FIG. 3 is a transverse sectional view taken along a plane passing through section line 3—3 of FIG. 1.

FIG. 4 is a partial transverse sectional view taken along a plane passing through section line 4—4 of FIG. 3, particularly illustrating the winding of a potentiometer resistance wire on a card which serves as a means for producing a sinusoidal signal from a D.C. supply of voltage.

FIG. 5 is a front elevational view of the face of the generator having a representation of a rotor imprinted thereon.

FIG. 6 is an electrical schematic diagram illustrating the circuit of the present invention.

FIG. 7 is an electrical schematic diagram illustrating switch means connected to the output of the signal generator for providing a visual indication of phase operation.

FIG. 8 is an electrical schematic diagram illustrating an accessory to be used with the signal generator in order to demonstrate the concept of power factor.

The general principles underlying the present invention will be apparent by analyzing FIG. 6 wherein a basic circuit module for a single electrical phase, is generally denoted by reference numeral 10. In order to generate three phases, three modules are used. The module 10 includes a sine wave generating potentiometer having a winding 12 associated with a wiper or contact arm 14. The potentiometer winding 12 includes a first input terminal 16 and a second terminal 17. A center output tap 19 for the winding is connected to the positive terminal of a D.C. voltage source 18 by means of conductor 24. The winding terminal 16 is connected to the negative terminal of source 18 through a fixed load resistor 22 and an on-off switch section 20. A voltage balancing rheostat 28 includes a wiper arm 26 connected to the terminal 17 of potentiometer winding 12. The input terminal of the rheostat winding is connected to the D.C. source 32 through a voltage polarity selector switch 34. The particular arrangement of the selector switch is discussed hereinafter. However, suffice it to say that the selector switch provides reversible D.C. voltage polarity to the potentiometer terminal 17 so that a rectified signal may be generated at the potentiometer output. As explained hereinafter, the first mode evidences the generation of a normal sinusoidal waveform. The second mode witnesses the generation of half-wave rectification and the third mode causes generation of full wave rectification.

The waveform output produced at the potentiometer wiper 14 is fed to the first input terminal 36 of a D'Arsonval movement 38. The second input terminal 42 of the movement is connected to a scale adjusting rheostat 42. The D'Arsonval movement 38 serves as a monitoring meter for indicating the variation in the generated output waveform from the potentiometer output.

In order to obtain symmetrical cycle portions, the rheostat 42 is set to maximum resistance while the potentiometer wiper 14 is displaced toward terminal 16. The rheostat 42 is then adjusted until the meter is set to +100% scale value. The potentiometer wiper 14 is then displaced to the opposite terminal 17 and by varying the rheostat 28, −100% scale value is obtained. With the adjustments so set, the sinusoidal portions will be symmetrical. Thus, with the selector switch 34 set in the first mode of operation, and movement imparted to potentiometer wiper 14 at a constant linear speed, the meter 38 will indicate equal positive and negative swings representative of sinusoidal generation.

Additional indicating means are included to provide a more dramatic visual indication of the positive and negative peak portions of the waveform generated. A peak detecting switch 44 is connected to the output of the signal generating potentiometer at wiper 14 and center tap 19. As hereinafter discussed in greater detail, the switch comprises two sections, a first section for detecting the positive cycle portion and the second section detecting the negative cycle portion. The switch 44 is connected to a visual indicator 46, preferably in the form of electrical lamps, respectively connected to the switch section of switch 44 and becoming sequentially energizable in response to the actuation of the respective switch sections.

Considering in greater detail the structure for generating plural phases, reference is made to FIGS. 1–4 wherein a multipotentiometer assembly is generally indicated by reference numeral 48. The particular assembly illustrated is employed for generating a three phase signal. Thus, three wave generating potentiometers are employed. However, as will be appreciated, the number of potentiometers assembled may be varied as desired. Structurally, each wave producing potentiometer includes a base plate 49 composed of an insulative material upon which the winding 12 of closely wound parallel turns of resistive wire is laid as indicated in FIG. 2. The winding extends between the upper and lower edges of the base plate with the ends of the wire connected to terminals 16 and 17 established at terminal lugs as shown in FIG. 2. As FIGS. 1 and 3 illustrate, the base plates 49 are disposed in spaced parallel relation, with threaded shafts 50 extending through the base plates at the locations of the four corners. The base plates 49 include centrally formed apertures mounting bushings 54 through which a shaft 52 extends, to minimize frictional deterioration of the plate.

Referring to FIG. 4, the orientation of the resistive winding 12 in the vicinity of the central base plate portion is illustrated. As will be seen, the winding immediately adjacent bushing 54 is deformed to permit clearance between the winding turns and the bushing.

Referring to FIGS. 1 and 3, centrally apertured collars 56 are secured to the shafts 52 by setscrews 57 adjacent to bushings 54 and confronting the windings 12 of associated base plates 49. Each collar 56 includes a first continuous commutating disc 58 having a wiper arm 14 attached thereto and extending to make contact with the resistive wire winding 12. The wiper arm for one particular phase is indicated by reference numeral 14a and as seen in FIG. 2, the remaining wiper arms 14b and 14c being displaced 120 angular degrees therefrom. Each wiper arm is adapted to circumscribe a circular path of travel across the face of an associated winding. A second commutating disc 60 is placed in overlying contacting relation with the first disc 58. A brush 62 is mounted in cantilevered fashion by a stationary connector 64. The opposite end of the brush engages the commutating disc 60. Accordingly, electrical continuity for each potentiometer is provided by a path including windings 12, a wiper arm 14, commutator discs 58 and 60, brush 62, and terminal 64. An output lead 66 as shown in FIG. 2 is furnished to connect the brush 62 to the meter input terminal 36 as illustrated in FIG. 6.

The front panel 68 of the assembly 48 has a representation of a rotor inscribed thereon as illustrated in FIG. 5. This front panel 68 is retained on the assembly by knurled knobs 70 secured to the threaded shafts 50 which enable rapid connection of the front panel to the assembly.

A crank handle 72 is connected to the end of shaft 52 by means of a setscrew 74. A rear panel 76, having a centrally inserted bushing, provides support for the handle end portion of the shaft 52. The entire assembly is mounted on a base 78. In normal mechanical operation of the assembly 48, crank 72 is manually rotated which causes linked rotation of the wiper arms which are retained in fixed angular relation to each other.

The signal generating potentiometer assembly has been described in terms of three separate potentiometers, with a view indicating to a learning student that each phase is generated separately. However, if manufacturing and economics warrant, the wiper arms may be mounted in tandem upon one boss 56 when suitably insulated from each other, in which case the wiper arms would still be maintained in a preselected angular relation.

Referring once again to FIG. 6, the various modes of sinusoidal generation for each phase, including rectification, will be explained. The voltage polarity selector switch 34 is of the double pole double-throw type having first pole contacts 80 and 82. The contact 80 is connected to the connecting lead 30 and the contact 82 is connected to the center tap 19 of the potentiometer winding 12 through on-off switch 20 and connecting lead 24. Criss-cross leads 84 and 86 connect the contacts 80 and 82 to the contacts 80' and 82' associated with the opposite throw position of the switch. The movable contact arms 86 of the switch are connected to the terminals of D.C. supply source 32.

In the first mode of operation, namely for the generation of a normal sine wave, the selector 34 engages the contacts 80' and 82' thereby impressing positive polarity on terminal 80 and negative polarity on terminal 82. Thus, potentiometer terminal 16 is maintained at a negative potential while the opposite terminal 17 is maintained at a positive potential. The center tap 19 of the potentiometer winding 12 is connected to the positive terminal of source 18 and the negative terminal of source 32 via a connecting lead 24. By so connecting the center tap to the sources, the center tap serves as a neutral or "grounded" point.

By turning crank 72 of the potentiometer assembly 48 shown in FIG. 1, the potentiometer wiper 14 of FIG. 6 is caused to move in a circular path between the negative terminal 16, the neutral point, and the positive terminal 17. As the arm cuts across the winding, at varying angles with respect to the drection of each turn, a sine wave is generated.

In the second mode, full wave rectification is effected by displacing the switch selector 34 into engagement with contacts 80 and 82. In this instance, the switch contact 82 is maintained at a positive potential and the switch contact 80 is maintained at a negative potential. Accordingly the terminals 16 and 17 of the potentiometer winding 12 are maintained at negative potentials thereby causing the generation of a full wave rectified signal as the wiper 14 travels in a circular path.

In the third mode of operation, the switch selector 34 is positioned in a neutral or "off" position to establish half wave rectification. In this position, switch contacts 80 and 82 remain unenergized so that no voltage potential is applied to terminal 17. Thus, only potentiometer terminal 16 maintains a potential thereat, which is negative. As the potentiometer wiper 14 travels in a circle between terminals 16 and 17, a half-wave rectified signal will be generated.

FIG. 7 represents the particular circuitry of detection switch means 44 which serves to drive signal peak indicators. The figure illustrates an electronic switch used for each of the phases of operation.

The electronic switch means 44 includes input leads 85 and 86. Lead 85 is connected to the emitter 88 of the transistor 90 through a load resistor 92. The collector 94 of the transistor is serially connected to a lamp 98 and the negative terminal of a D.C. biasing supply 100. The base terminal 96 of the transistor is connected to the positive terminal of the source. The transistor operates as a gated switch wherein the collector base junction is reversed biased and the emitter-base junction is connected to the output of the sinusoidal wave generator 10. In operation, when the positive peak portion of a waveform is impressed across input lines 85 and 86, the transistor 90 conducts causing the flashing energization of lamp 98. A second similar stage is employed in conjunction with transistor 104 and operates to indicate the negative cycle portion. Particularly, the emitter 102 of transistor 104 is connected to the input line 86 through an emitter load resistor 106. The base terminal 108 is connected to the input line 85 through a load resistor 110. The transistor collector 112 is connected to the negative terminal of a D.C. bias supply 118 through a second indicating lamp 116. As in the case of the first transistor, the second transistor 104 is characterized by a normally back biased collector-base junction. Upon the generation of a negative cycle portion across the emitter-base junction, the transistor is switched to a conducting state which causes flashing energization of lamp 116.

The lamps 98 and 116 are mounted on a panel 68 along with two other pairs of lamps representing the positive and negative cycles of the other two phases in a three phase system. The lamps are arranged in a circular manner. Thus with all three phases in operation, the lamps of all phases will be energized sequentially in circular order to represent a rotating magnetic field in the stator of a three phase motor.

Referring to FIG. 8, an accessory circuit 126 is indicated which demonstrates phase shifting networks and power factor of a phase. The accessory circuit is connected to the output of the wave generating potentiometer circuit indicated by 10 and includes input lines connected across a voltmeter 130 and a serially connected load resistor 132. A capacitor when connected across the input terminals through an intermediately disposed ammeter 136 which measures the current going to the capacitor will demonstrate current leads voltage from a comparison of the readings on the voltmeter and ammeter. Similarly, an inductor when connected across the input terminals through an ammeter 140, will demonstrate current lagging voltage. When inductance 138 is placed in parallel with the capacitor 134 through a serially connected ammeter 140 which measures the current going to the inductor, a change in the reading of meter 136 will show correction for inductive reactance during operation of the device 10 while the second ammeter 140 does not change because it reads uncorrected power factor.

The foregoing is considered as illustrative only of the principles of the invention. Further, since numerous modifications and changes will readily occur to those skilled in the art, it is not desired to limit the invention to the exact construction and operation shown and described and accordingly all suitable modifications and equivalents may be resorted to, falling within the scope of the invention.

What is claimed as new is as follows:

1. A device for demonstrating the characteristics of electrical phase comprising a source of D.C. voltage potential, at least one signal generating means for generating a substantially sinusoidal signal having positive and negative cycle portions and having an input and an output, the input being connected to the voltage source, a meter connected to the output for responding to signal variations, first switch means connected to the output for responding to the positive cycle portion of the signal, second switch means connected to the output for responding to the negative cycle portion of the signal, and visual indicators connected to the switch means for separately indicating the positive and negative cycle portions and including a phase shifting demonstrator comprising a parallel circuit connected across the generator means output, the circuit having a capacitor and an inductor, a voltmeter connected across the output to monitor the generated voltage, and ammeters connected in circuit with the capacitor and the inductor respectively for monitoring the current flow thereto, said capacitor being in series with one of the ammeters and in parallel with the inductor.

2. The device set forth in claim 1 wherein the device comprises a plurality of generating means for generating a corresponding plurality of signals having a preselected fixed phase relation.

3. A device for demonstrating the characteristics of electrical phase comprising a source of D.C. voltage potential, at least one signal generating means for generating a signal having positive and negative cycle portions and having an input and an output, the input being connected to the voltage source, a meter connected to the output for responding to signal variations, first switch means connected to the output for responding to the positive cycle portion of the signal, second switch means connected to the output for responding to the negative cycle portion of the signal, and visual indicators connected to the switch means for separately indicating the positive and negative cycle portions, first and second switch means comprising respective single transistor gated switching stages having an input and an output, each transistor being normally biased in an off condition, the occurrence of an associated cycle portion at the input turning the transistor on, the output being connected to a visual indicator becoming energized when an associated transistor is turned on, three generating means being employed to represent three phase operation and wherein said visual indicators are incandescent lamps connected in circuit with each phase, the lamps being mounted in a circle for representing a rotating magnetic field in a motor in response to sequential illumination.

4. A device for demonstrating the characteristics of electrical phase comprising a source of D.C. voltage potential, at least one signal generating means for generating a substantially sinusoidal signal having positive and negative cycle portions and having an input and an output, the input being connected to the voltage source, a meter connected to the output for responding to signal variations, first switch means connected to the output for responding to the positive cycle portion of the signal, second switch means connected to the output for responding to the negative cycle portion of the signal, and visual indicators connected to the switch means for separately indicating the positive and negative cycle portions and including polarity reversing means for varying the voltage polarity applied to the input of the generating means to simulate a rectified signal at the output of the generating means.

5. A signal wave generator comprising a mounting member, multi-turn winding made of a resistance wire wrapped around the member having first and second terminals at opposite ends of the wire, a center tap terminal connected to the wire, means connected to first and second terminals for maintaining different D.C. potentials thereat, a contact arm in wiping engagement with the winding having an output terminal, means rotatably mounting the arm about an axis extending through the member for establishing a circular contact path, and means connected to the output terminal for conducting a sinusoidal signal in response to movement of the contact arm along said circular path and including resistive means connected to the first and second terminals for equalizing the resistance between the first and second terminals and the center tap terminal, whereby a symmetrical signal may be generated.

6. A plurality of signal generators as set forth in claim 5 arranged in parallel spaced relation, means linking the contact arm associated with each of the signal generators in a preselected angular relation, and means for rotating the linked arms to cause generation of output signals at the output terminals of the contact arms in phase relation corresponding to said angular relationship of the arms.

7. A signal wave generator comprising winding means having a pair of input terminals and an intermediate tap terminal, a source of D.C. potential, movable contact means in wiping engagement with said winding means, output means connected to the contact means and the tap terminal for conducting a cyclically varying signal in response to movement of the contact means, and resistive means connecting said input terminals to the source for adjusting resistances between the input terminals and the tap terminal.

8. The combination of claim 7 wherein said output means includes peak detecting indicator means.

9. The combination of claim 7 wherein said resistive means is adjusted to produce a symmetrical signal.

References Cited

UNITED STATES PATENTS

| 2,471,315 | 5/1949 | Dehmel | 35—25 |
|---|---|---|---|
| 2,590,228 | 3/1952 | Brown | 175—320 |
| 2,939,067 | 5/1960 | Wouk | 321—15 |
| 3,003,697 | 10/1961 | Higginbotham | 235—186 |
| 3,089,078 | 11/1963 | Smith et al. | 321—49 |

ROBERT W. MITCHELL, Primary Examiner

L. ANTEN, Assistant Examiner